A. DOUAUD.
FUEL HEATER.
APPLICATION FILED DEC. 12, 1913.
1,271,143.
Patented July 2, 1918.
5 SHEETS—SHEET 1.
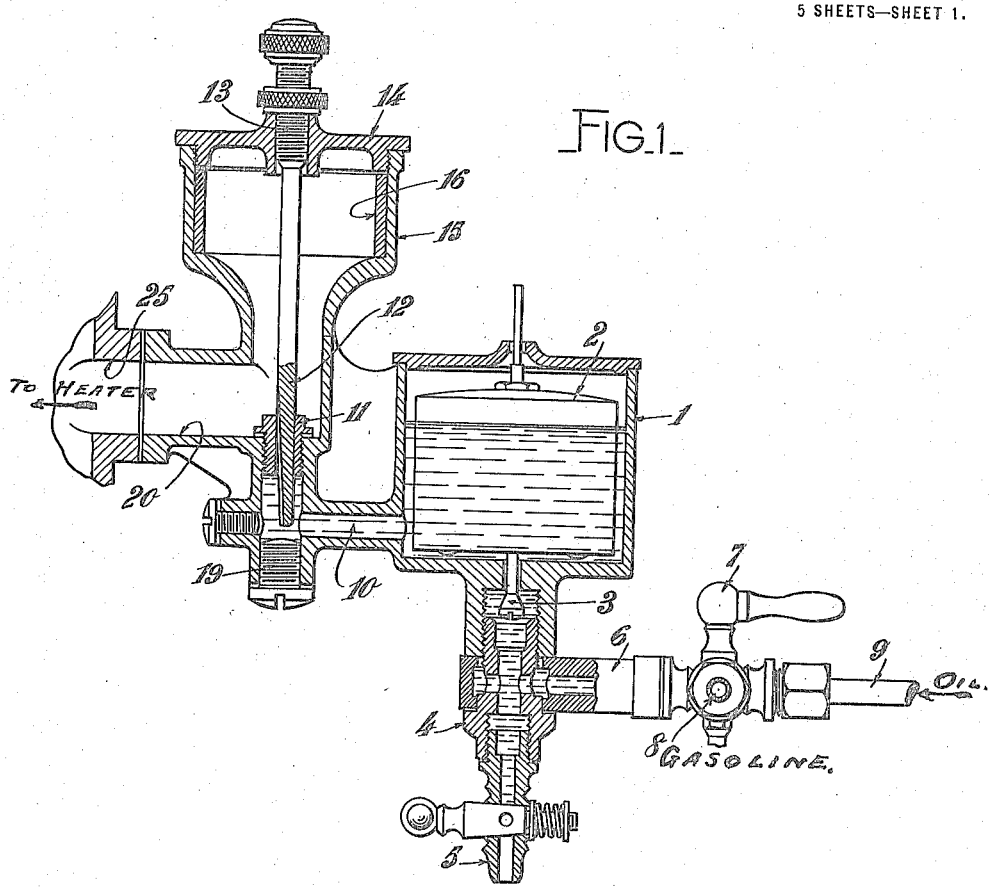
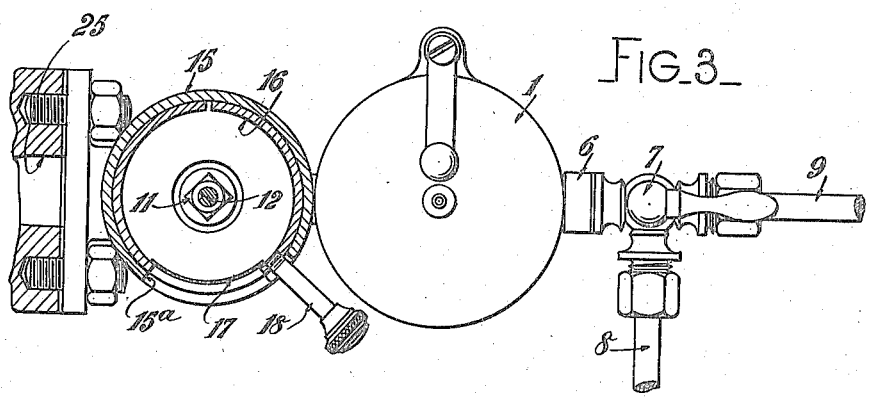
WITNESSES:
John C. Sanders
Albert F. Neuman
INVENTOR:
Alexandre Douaud
BY Mr Wallace White
ATT'Y

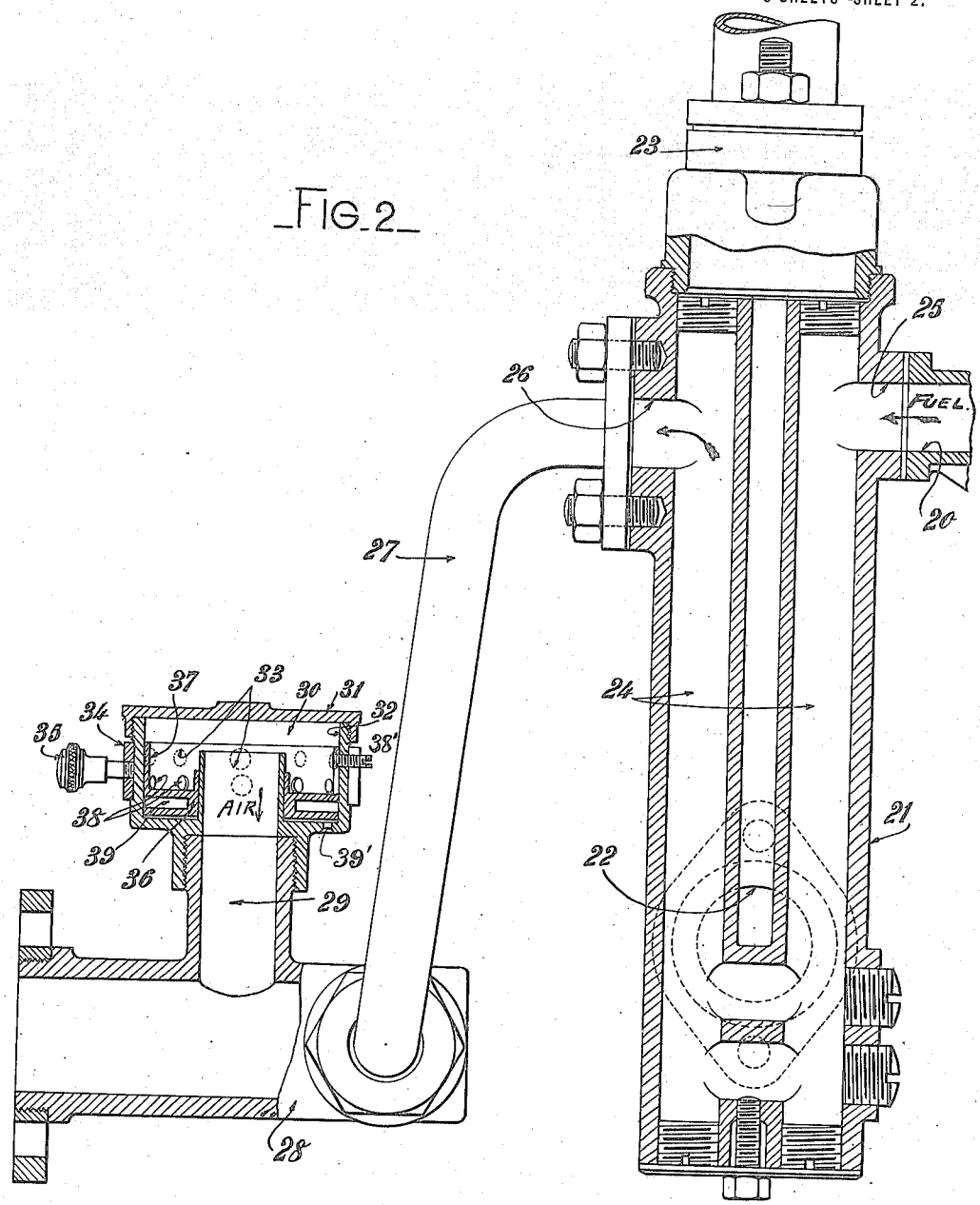

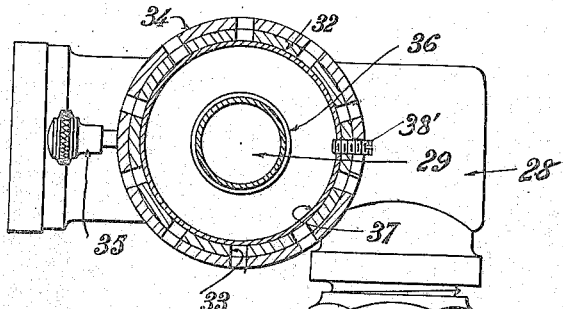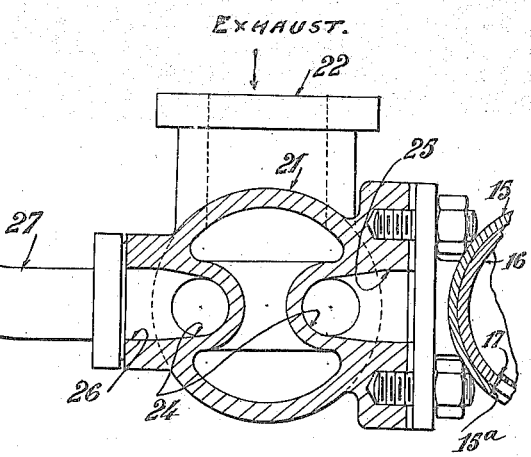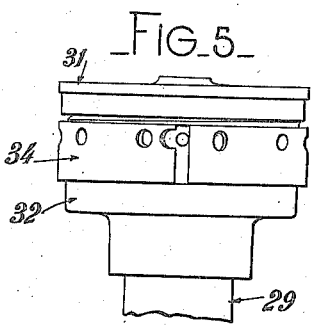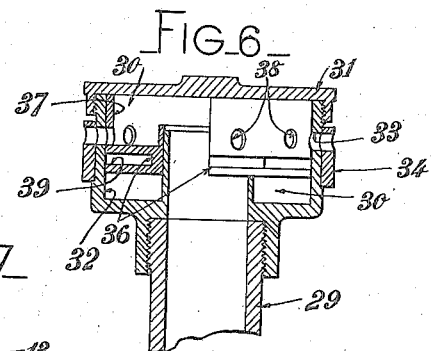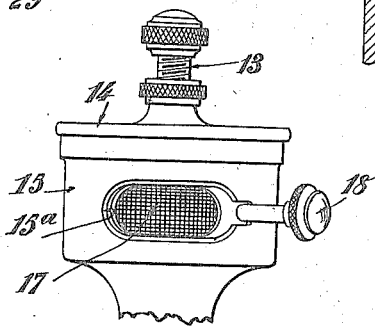

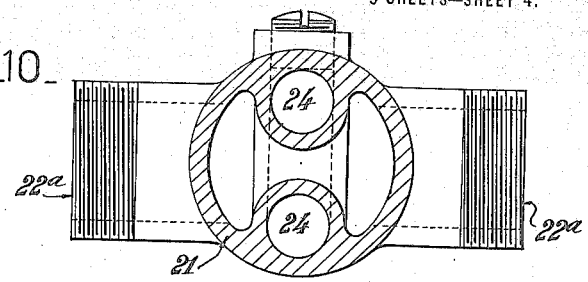
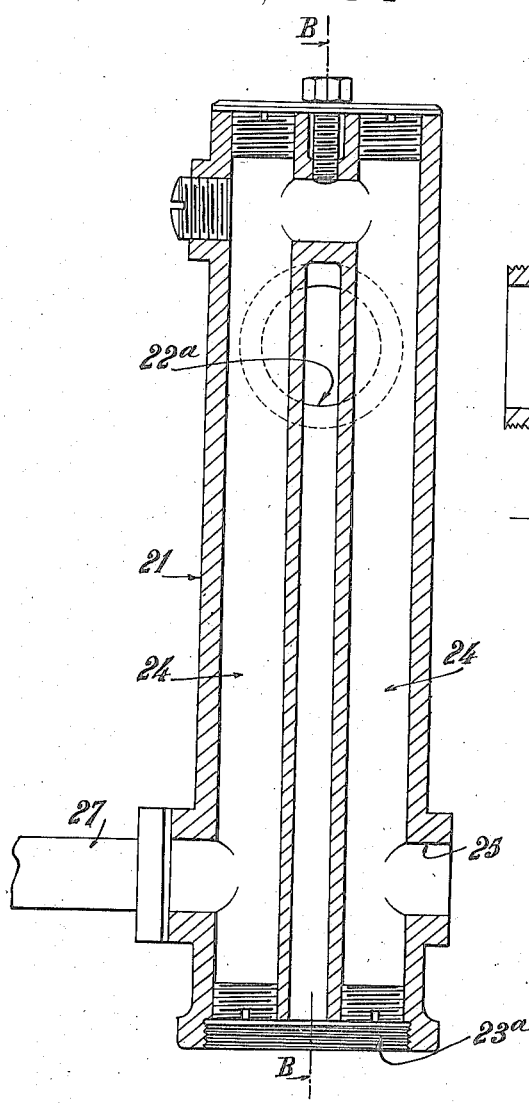
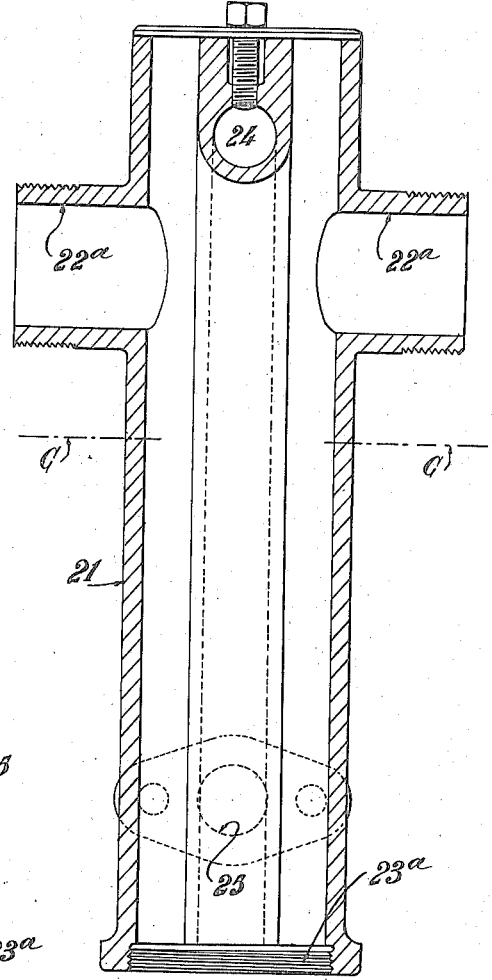

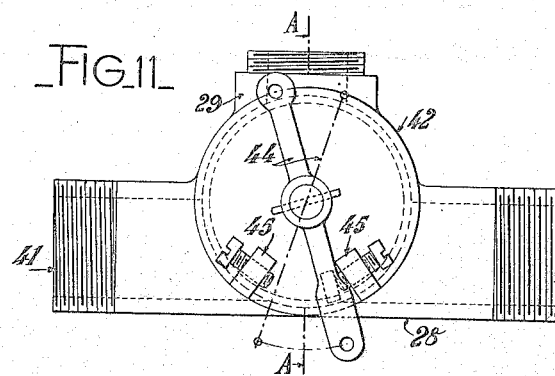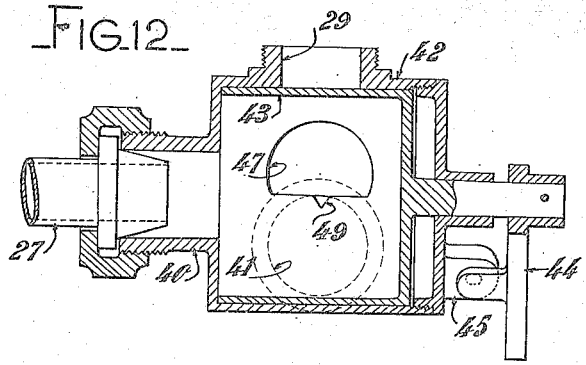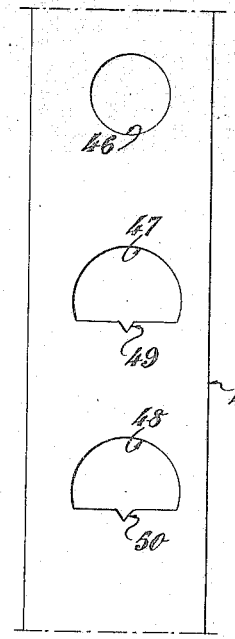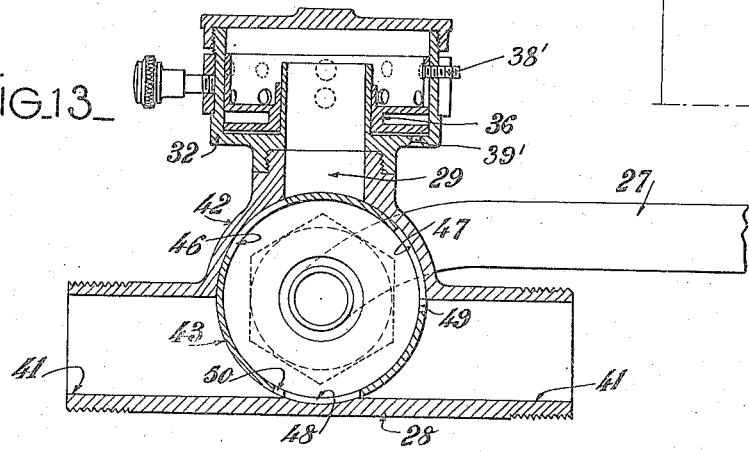

UNITED STATES PATENT OFFICE.

ALEXANDRE DOUAUD, OF NANTES, FRANCE.

FUEL-HEATER.

1,271,143.　　　　　Specification of Letters Patent.　　Patented July 2, 1918.

Application filed December 12, 1913.　Serial No. 806,198.

*To all whom it may concern:*

Be it known that I, ALEXANDRE DOUAUD, citizen of the Republic of France, residing at Rue de la Pelleterie, Nantes, Loire Inferieure, in the Republic of France, have invented new and useful Improvements in Fuel-Heaters, of which the following is a specification.

This invention relates to a carbureting apparatus or fuel feeding device provided with vaporizing means intended more particularly for internal combustion motors, using heavy liquid fuels such as lamp petroleum, heavy oils, shale oil, tar, etc.

This apparatus obviates the use of any injection device and allows of using very cheap fuels.

In the annexed drawings given by way of example,

Figure 1 is a vertical section partly in elevation of a part of the improved apparatus.

Fig. 2 is a corresponding vertical section of the remaining part of the apparatus, Fig. 3 is a horizontal section partly in plan of the parts shown in Fig. 1.

Fig. 4 is a horizontal section partly in plan, of the parts shown in Fig. 2, a diaphragm of the automatic air inlet valve being supposed to be in its lowered position as shown in Fig. 2.

Figs. 5 and 6 are details of the automatic air inlet valve, the diaphragm being shown raised.

Fig. 7 is an elevation of the initial air inlet valve.

Fig. 8 is a detail in vertical section of a modified construction of the vaporizer proper, Fig. 9 is a vertical section along B—B, Fig. 8.

Fig. 10 is a horizontal section along the line C—C, Fig. 9, viewed from below.

Fig. 11 is a front view of a modification of a union supporting the automatic air inlet valve.

Fig. 12 is a cross section along the line A—A, Fig. 11.

Fig. 13 is a longitudinal section of said union.

Fig. 14 is an unfolded view of the periphery of a cock plug.

The apparatus comprises feeding means for the fuel comprising a constant level reservoir 1 of the usual type provided with a float 2 carrying a conical valve 3. To the lower part of the reservoir 1 is screwed a union 4 which comprises a vertical tube 5 provided with a cock for emptying the reservoir 1 or for cleaning purposes. Between the reservoir 1 and the union 4 is a turnable tube 6 which is provided with a three way cock 7 connected to two channels 8 and 9 allowing the supply to the reservoir 1 of light hydrocarbon for starting or heavy oil for normal working.

The fuel as it issues from the constant level reservoir 1 passes through the lateral tube 10 to the distributing nozzle 11 provided with a regulatable pin 12. The latter is constituted by a cylindrical rod cut away longitudinally in a beveled manner, so as to provide variable sizes of passage for the liquid, according to the height of the rod 12 which is adjustable by means of its screw threaded part 13 screwing in the cover 14 of the chamber 15. This chamber 15 which constitutes the first regulatable inlet for the air has a lateral opening 15ª and is provided inside with a split spring ring 16 which can be turned with slight friction in the chamber 15. The ring 16 has also an opening 17 (Fig. 7) covered with wire gauze and can be displaced by means of a button 18 so as to allow as required a certain quantity of air to pass into the chamber 15 and mix with the fuel fed through the nozzle 11. The chamber 15 being closed at the base by a plug 19, the heavy oil falling from the nozzle 11 at the stopping of the engine cannot fall on the ground through the air admission orifice and is utilized when re-starting.

The benzin or the heavy oil, which may be mixed with air by means of the air inlet device just described passes through the tube 20 into the gasifier or vaporizer 21 proper which is formed by a wide tube or cylinder provided with two extensions 22 and 23 serving respectively for the entrance and the outlet of the exhaust gases from the motor which traverse the entire length of the cylinder 21. Inside this cylinder are cast two conduits or tubes 24 which communicate together at one end and are connected with an inlet tube 25 which communicates with the tube 20 and with an outlet tube 26. The fuel passes through the tubes 24 which are licked and heated on their entire outer surface by the exhaust gases so that the fuel is completely vaporized.

The outlet tube 26 is connected by a pipe 27 to an automatic and regulatable air inlet device or valve, which comprises a union 28 connected to the admission orifice of the motor. This union 28 carries a vertical tube 29 which leads into a box or chamber 30 closed by a solid screw cover 31. The annular wall 32 of this chamber is provided with holes 33 which may be more or less obturated or uncovered by means of an external split ring 34 which lies elastically on the wall 32 and the position of which can be regulated by means of the handle 35. Inside the chamber 30 can slide exteriorly of the tube 29 or prolongation thereof formed as a part of the chamber 30, a valve or annular diaphragm 36 forming a piston and of which the vertical rim 37 is provided with orifices 38 corresponding to the orifices 33 of the wall 32. When this valve 36 is in the normal position that is to say, lowered, the orifices 38 and 33 do not coincide and consequently the air cannot enter even if the regulating ring 34 is positioned so as to allow it to enter. But by the action of the suction of the motor through the tube 29 above the valve or diaphragm 36, the latter is more or less raised so that its orifices 38 coincide more or less with the orifices 33 and the air is admitted through the tube 29 into the union 28 and mixes with the vaporized fuel supplied by the tube 27.

The valve 36 is limited in its sliding movements in either direction by a set pin or screw 38′, and said valve is provided in its base with a deep and narrow annular throat 39 which operates as a shock absorber or dash-pot for the valve, so that it cannot fall violently on the bottom of the box 30, nor violently strike the cover 31. The bottom wall of the chamber 30 is provided with an air opening or bleed duct 39′ permitting proper motion of the valve or piston in either direction.

The apparatus operates in the following manner. For starting the motor, the cock 7 is turned so as to admit into the apparatus through one of the tubes 8, 9 petrol, benzol or other light fuel, which passes through the tube 11 and mixes with the air introduced by the two air feed devices and passes to the motor, which can thereupon start. The hot exhaust gases in passing through the cylinder 21 of the vaporizer, strongly heat the tubes 24 traversed by the fuel so that the cock 7 can shortly be turned so as to admit the heavy oil or other heavy fuel into the apparatus. This fuel is vaporized during its passage through the tubes 24 and together with the air admitted forms a suitable mixture for the feed of the motor. The main admission of air is effected by the automatic device situated adjacent the introduction to the motor.

Figs. 8 to 14 show a modification which allows of an easy mounting of the apparatus on four cylinder engines. In this construction, the gasifier or vaporizer 21 is provided with two lateral extensions 22ª for the inlet of the exhaust gases, which escape at the bottom at 23ª. The fuel enters the vaporizer at 25, flows through both tubes or conduits 24 where it is vaporized and the vapor formed is led through the pipe 27 to an extension 40 of the union 28. The latter has, in this construction, two extensions or necks 41 through which the explosive mixture can flow to the cylinders of the engine.

The union 28 has also a cylindrical recess 42 in which a plug 43 can rotate. Said plug has for its object to permit of regulating at will the amount of combustible mixture fed to the engine and, consequently, the speed of the latter. Said plug may be actuated by means of a lever 44 the stroke of which is limited by adjustable stops 45 (Fig. 11). The plug 43 is hollow and its cavity is in communication with the extension 40 through which the vaporized fuel is led to the union 28. The plug has three openings 46, 47, 48 which may register respectively with the extension 29 in relation with the automatic air inlet device and both extensions 41 in relation with the engine cylinders. The opening 46 is circular in shape while the openings 47 and 48 have a straight portion in their edge provided with a notch 49, 50, respectively.

In the position shown which corresponds to the free running of the engine, the extension 29 is closed so that the automatic air inlet device 32 is inactive and a small quantity of vaporized combustible mixed with a certain amount of air drawn in through the first air inlet device 15 is fed to the cylinders through the notches, 49, 50. When the lever 44 has however been brought to the position shown in dotted lines in Fig. 11, the extensions 41 are in open communication with the extensions 40 and 29 and the amount of vaporized fuel sucked in through the extension 40 and the amount of air sucked in through the extension 29 are at a maximum. Intermediate positions of the lever 44 correspond with varying quantities of fuel and air sucked in and consequently insure intermediate speeds of the engine. By means of the cock plug just described the amount of air drawn in through the automatic air inlet valve varies in proportion with the amount of vaporized fuel admitted to the cylinders and a constant proportion between the fluids in the mixture is obtained.

The invention is naturally not limited to the details shown and described. In particular instead of casting the tubes 24 together with the cylinder 21, two or more separate tubes could be used suitably fixed in the cylinder, the fuel passing through these tubes successively. The vaporizing cylinder 21 could naturally be placed in any position.

Having now described my invention, what I claim as new and desire to secure by Letters Patent is:

A heater or vaporizer for carbureting apparatus using heavy fuel comprising in combination a tubular chamber, rectilinear conduits formed in said chamber extending through the whole length thereof and arranged so that the fuel passes through them successively, throughout their entire length, removable stoppers closing the ends of said conduits, and a rectilinear passage formed between the fuel conduits and through which the exhaust gases are adapted to pass, substantially as described and for the purpose set forth.

In testimony whereof I have signed my name to this specification in the presence of two subscribing witnesses.

ALEXANDRE DOUAUD.

Witnesses:
  OELPH RENAULT,
  MONTAGUE T. BUTT.